United States Patent
Trainin

(10) Patent No.: US 9,066,267 B2
(45) Date of Patent: Jun. 23, 2015

(54) DEVICE, METHOD AND SYSTEM OF ESTABLISHING A PROTECTED TIME DURING AN ALLOCATED TIME

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 12/544,917

(22) Filed: Aug. 20, 2009

(65) Prior Publication Data

US 2010/0054213 A1    Mar. 4, 2010

Related U.S. Application Data

(60) Provisional application No. 61/092,817, filed on Aug. 29, 2008.

(51) Int. Cl.
*H04W 28/26*    (2009.01)
*H04W 72/04*    (2009.01)
*H04W 76/02*    (2009.01)

(52) U.S. Cl.
CPC .......... *H04W 28/26* (2013.01); *H04W 72/0446* (2013.01); *H04W 76/023* (2013.01)

(58) Field of Classification Search
CPC .......................... H04W 28/26; H04W 72/0446
See application file for complete search history.

(56) References Cited

U.S. PATENT DOCUMENTS

| | | | |
|---|---|---|---|
| 7,523,205 B1 | 4/2009 | Sherman | |
| 7,787,493 B2 | 8/2010 | Doi et al. | |
| 8,619,808 B2 * | 12/2013 | Chu et al. | 370/461 |
| 2005/0032478 A1 | 2/2005 | Stephens et al. | |
| 2005/0114749 A1 * | 5/2005 | Yonge et al. | 714/752 |
| 2005/0141545 A1 * | 6/2005 | Fein et al. | 370/445 |
| 2006/0132298 A1 * | 6/2006 | Kavaler | 340/521 |
| 2006/0268760 A1 | 11/2006 | Fang et al. | |
| 2007/0002814 A1 | 1/2007 | Benveniste | |
| 2007/0014237 A1 * | 1/2007 | Nishibayashi et al. | 370/229 |
| 2007/0076742 A1 | 4/2007 | Du et al. | |
| 2007/0147312 A1 * | 6/2007 | Shapira | 370/337 |
| 2007/0238482 A1 * | 10/2007 | Rayzman et al. | 455/552.1 |

(Continued)

FOREIGN PATENT DOCUMENTS

| | | | |
|---|---|---|---|
| JP | 2004-535695 A | 11/2004 | |
| JP | 2006-020289 A | 1/2006 | |

(Continued)

OTHER PUBLICATIONS

Korakis, Thanasis et al. "CDR-MAC: A protocol for full exploitation of directional antennas in Ad Hoc Wireless Networks" IEEE Trans. on Mobile Computing, Feb. 2008, vol. 7, No. 2.

(Continued)

*Primary Examiner* — Jianye Wu
(74) *Attorney, Agent, or Firm* — John F. Travis

(57) ABSTRACT

A wireless communication device and a method to establish a protected time for communication over a direct link between two stations of the same network. The method includes configuring at least one antenna for a direct link establishment, switching to a listening mode and waiting for a channel time allocation (CTA) for transmission. After receiving the CTA a source station sends a first frame to a destination station based on a channel time allocation value and receive a second frame from the destination station to complete an establishment the CTA.

18 Claims, 3 Drawing Sheets

(56) References Cited

U.S. PATENT DOCUMENTS

| | | | |
|---|---|---|---|
| 2007/0258431 A1* | 11/2007 | Shin et al. | 370/345 |
| 2008/0130519 A1* | 6/2008 | Bahl et al. | 370/254 |
| 2008/0144493 A1* | 6/2008 | Yeh | 370/230 |
| 2012/0063446 A1* | 3/2012 | Chu et al. | 370/349 |

FOREIGN PATENT DOCUMENTS

| | | |
|---|---|---|
| JP | 2006-186603 A | 7/2006 |
| JP | 2007-089172 A | 4/2007 |
| JP | 2008-532393 A | 8/2008 |
| WO | 02071650 A1 | 9/2002 |
| WO | 2006094578 | 9/2006 |
| WO | 2010/025100 A2 | 3/2010 |
| WO | 2010/025100 A3 | 6/2010 |

OTHER PUBLICATIONS

International Search report and Written opinion of International Application No. PCT/US2009/054729, Filed Aug. 24, 2009. Mailing date Mar. 29, 2010.
Office Action for Chinese Patent Application No. 200910168786.7 mailed on Nov. 23, 2011.
Korakis et al. "CDR-MAC: A Protocol for Full Exploitation of Directional Antennas in Ad Hoc Wireless Networks", IEEE Transactions on Mobile Computing, vol. 7 No. 2, Feb. 2008, 11 pages.
Office Action for Japanese Patent Application No. 2011-525118, mailed on May 28, 2013, including 2 pages of English translation.
Office Action Received for Chinese Patent Application No. 200910168786.7, Mailed on Aug. 31, 2012, 10 pages of Office Action including 6 pages of English Translation.
Office Action Received for Japanese Patent Application No. 2011-525118, Mailed on Sep. 4, 2012, 6 pages of Office Action including 3 pages of English Translation.
International Preliminary Report on Patentability Received for PCT Patent Application No. PCT/US2009/054729, Mailed on Mar. 10, 2011, 6 pages.
Office Action for Taiwan Patent Application No. 98128795 mailed on Jan. 7, 2013, 9 pages with 3 pages partial translation.
Office Action Received for Chinese Patent Application No. 200910168786.7, Mailed on Mar. 13, 2013, 20 pages of Office Action including 12 pages of English Translation.
Office Action for Chinese Patent Application No. 200910168786.7, mailed on Oct. 15, 2013, 8 pages, including 5 pages of English translation.
Office Action for Taiwanese Patent Application No. 98128795 mailed on Aug. 26, 2013, 4 pages, including one page of a partial English translation.
Office Action for Japanese Patent Application No. 2013-201029, mailed on Jul. 15, 2014, 6 Pages of Office Action and 6 Pages of English translation.
Office Action for Chinese Patent Application No. 200910168786.7, mailed on May 20, 2014, 7 Pages of Office Action and 13 Pages of English translation.
Office Action Received for Japan patent Application No. 2013-201029 mailed on Nov. 4, 2014, 3 pages of Office Action and 3 pages of English Translation.

* cited by examiner

DEVICE, METHOD AND SYSTEM OF ESTABLISHING A PROTECTED TIME DURING AN ALLOCATED TIME

This application claims priority from provisional application No. 61/092,817 filed Aug. 29, 2008, incorporated herein by reference in its entirety.

BACKGROUND OF THE INVENTION

A personal wireless area network (WPAN) is a network used for communication among computing devices (for example, personal devices such as telephones and personal digital assistants) close to one person. The reach of a WPAN may be for example a few meters. WPANs may be used for, e.g., interpersonal communication among personal devices themselves, or for connecting via an uplink to a higher level network, for example the Internet.

The IEEE 802.11 ad was formed in year 2008. IEEE 802.11 ad is developing a millimeter-wave (mmWave) based alternative physical layer (PHY) for the existing 802.15.3 Wireless Personal Area Network (WPAN) Standard e.g., IEEE 802.15.3-2003. This mmWave WPAN may operate in a band including the 57-64 GHz unlicensed band defined by FCC 47 CFR 15.255 and other regulatory bodies and may be referred to as "60 GHz". The millimeter-wave WPAN may allow very high data rate (e.g., over 2 Gigabit per second (Gbps)) applications such as high speed Internet access, streaming content download (e.g., video on demand, high-definition television (HDTV), home theater, etc.), real time streaming and wireless data bus for cable replacement.

However, a mmWave communication link is significantly less robust than links operating at lower frequencies (e.g. 2.4 GHz and 5 GHz bands) due to the Friis transmission equation, oxygen absorption and high attenuation through obstructions. In addition, the mmWave communication link may use a directional antenna and/or antennas array to increase the communication range an operational rate. The use of a directional antenna makes a link very sensitive to mobility. For example, a slight change in the orientation of the device or the movement of a nearby object and/or person may disrupt the link.

In the IEEE 802.11 specification, the carrier sense mechanism solves the frame interference problem by not sending the frame in the presence of the carrier. The IEEE 802.11 assumption of equal (omni) carrier sense on any of the devices is very basic for CSMA/CA based WLAN and the physical carrier sense is an important mechanism of the multiple access.

This assumption of omni carrier sense is not valid in the 60 GHz spectrum. A communication link operating at mmWave frequencies (e.g., 60 GHz) has significant attenuation. In order to satisfy the link budget requirement, directional antennas may be used. One result of the massive use of the direct or directed antennas is that the carrier sense indication may not be equal at the transmitter and at the receiver. For example, a station may not sense the physical and virtual carrier of the frame transmitted by another station. Additionally, a station, may not sense the physical and virtual carrier of two interconnecting stations.

One notable disadvantage of WPAN 60 GHz network is that interference may occur when the same channel is used by two neighboring networks and an overlapping channel time for transmission is allocated to stations of both networks (e.g., a channel time allocation (CTA)).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
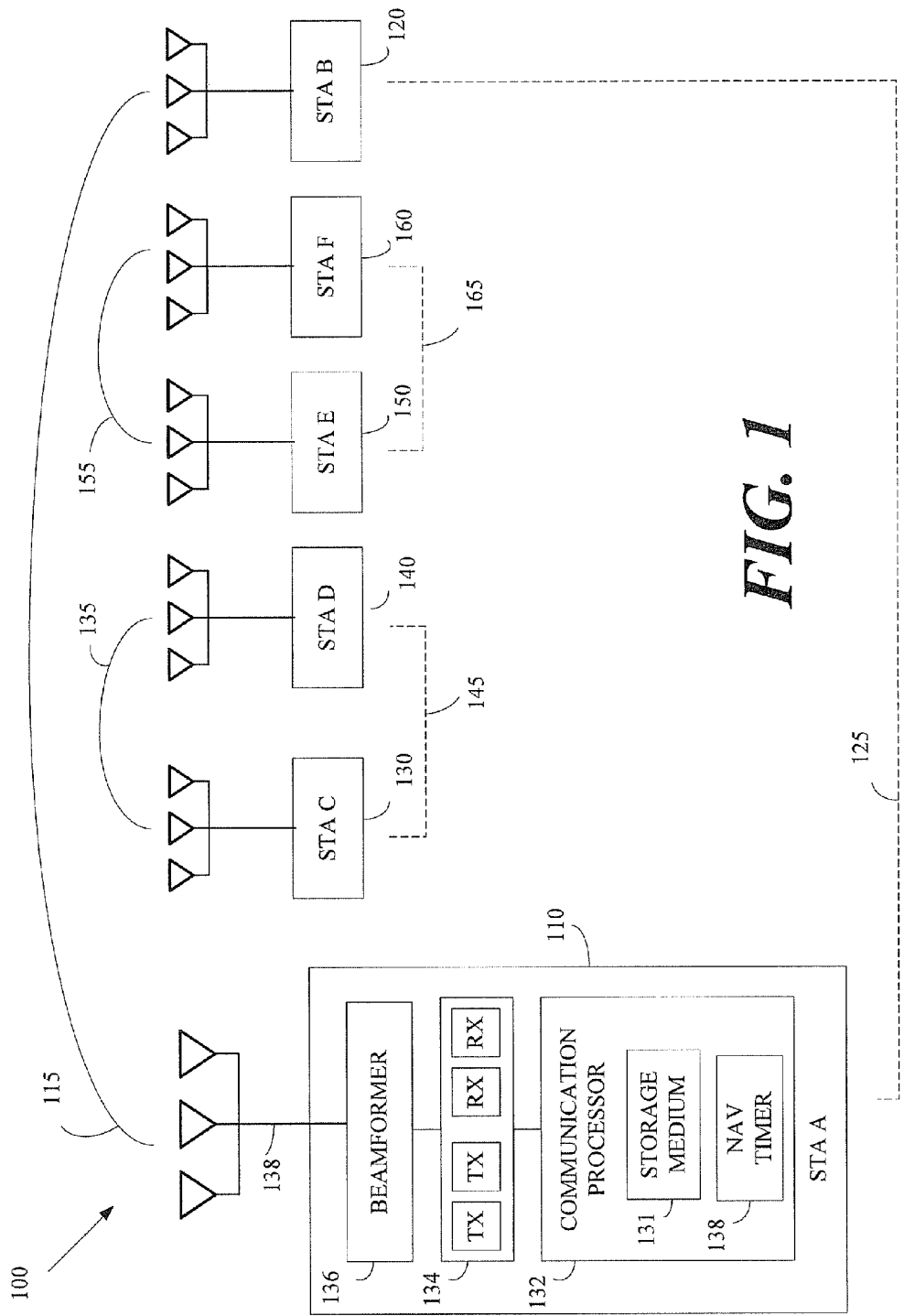
FIG. 1 is a schematic illustration of a wireless communication network according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more then one. The term plurality, as used herein, is defined as two, or more than two. The term another, as used herein is defined as at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of a wireless communication network 100, according to exemplary embodiments of the invention is shown. Wireless communication network 100 may include for example, a WPAN/WLAN. For example, wireless communication network 100 may operate according to the standard developed by the IEEE 802 802.11 Task Group ad (TGad). TGad is developing Enhancements for Very High Throughput in the 60 GHz Band for WLAN.

According to this exemplary embodiment of the invention, wireless communication network 100, for example a 60 GHz WPAN, may include stations 110, 120, 130, 140, 150 and 160. Stations 110, 120, 130 140 are depicted as stations (STA) e.g., STA A, STA B, STA C, STA D, STA E and STA F, respectively. Although the scope of the present invention is not limited in this respect, stations 110, 120, 130, 140, 150 and 160 may include equipment such as a camera, a mouse, an earphone, a speaker, a display, a mobile personal device or the like.

Furthermore, according to one exemplary embodiment of the invention, a pair of stations, for example STA A 110 and STA B 120, STA C 130 and STA D 140 and STA E 150 and STA F 160, may share a direct link of a privet basic service set (PBSS). For example, a PBSS#1 125 may include STA A 110 and STA B 120 and may able to establish a directed link 115, a PBSS#2 145 may include STA C 130 and STA D 140 and may able to establish a direct link 135 and a PBSS#3 165 may include STA E 150 and STA F 160 and may able to establish a directed link 155, It should be understood that networks PBSS#1 125, PBSS#2 145 and PBSS#3 are neighboring networks which are not able to transmit during a protected time for communication established by one of the networks. In addition, direct links 115, 135 and 155 may share the same channel, if desired.

According to this exemplary embodiment of the invention, STA A 110 may include a communication processor 132, a transceiver 134, a beamformer 136 and a one or more antennas 138. Communication processor 132 may include a storage medium 131 and a network allocation vector (NAV) timer 131 for reserving the wireless medium for a fixed time period. This time period may be used by the station for carrier sensing, although the scope of the present invention is not limited in this respect.

Communication processor 132 may be any processor that capable of executing instructions to operate and/or control wireless communication devices according to embodiments of the present invention (e.g., 60 GHz WPAN medium access controller (MAC)). Transceiver 134 may include plurality of transmitters (TX) and a plurality of receivers (RX). Antenna 139 may include a dipole antenna, an antenna array, an internal antenna, a one pole antenna or the like. According to embodiments of the invention, STA B 120, STA C 130, STA D 140 and STA E 150 may include a similar architecture as STA A 110 and the description of STA A 110 may be relevant to the description of STA B 120, STA C 130, STA D 140 and STA E 150 as well.

According to one embodiment of the invention, each pair of stations (e.g., STA A and STA B, STA C and STA D, STA E and STA F) may configure its antennas (e.g., antenna 138) for a direct link (e.g., direct links 115, 235 and 155) establishment. A pair of stations may include a Source station and a Destination station for example STA C 130 may be a Source station and STA D 140 may be a Destination station, if desired. A pair of stations may reserve protected time for communication by using Request To Send (RTS)/Clear To Send (CTS) handshaking, if desired.

According to embodiments of the invention, the Reserved Time may be allocated by the station that is Source of the data transfer to the corresponding Destination station. The Source station may also allow the Destination station sending data by using the reverse direction method. In any allocated Reserved Time both stations may receive acknowledgments (ACK) and/or data from the partner. Both the Source and Destination stations may be the owners of the reserved time, if desired.

Advantageously, the Reserved Time protection is to allow transmitting data and/or ACK during the Reserved Time in the established link by not more than one interfering pair of partner stations.

In operation, STA A 110 for example, a Source station, may configure antennas 138 to establish a direct link 115 with a Destination station (e.g., STA B 120). Communication processor 132 may configure antennas 138 to establish direct link 115 by executing instructions stored in storage medium 131. For example storage medium may include a flash memory, a read only memory (ROM), a random access memory (RAM) or the like. Communication processor 132 may control transceiver 134 and beamformer 136 to set antennas 136 according to a desired multiple-input-multiple-output (MIMO) scheme, although it should be understood that embodiments of the invention are not limited to this example.

Furthermore, when the direct link is established and the station is in listening mode, communication processor 132 may update NAV timer 138. For example, communication processor 132 may assert NAV timer 138 to a value received in a duration field of any received frame. NAV timer 138 may run at a speed of a global clock (not shown). NAV timer 138 may count down and may be locked at a value zero, if desired. Communication processor 132 may reset the NAV timer by receiving a frame containing a medium access control (MAC) address that may be equal to the MAC address in the frame that asserts the NAV timer value. The NAV timer value may not be changed when the duration filed of the received frame is shorter than the NAV timer remaining value.

According to some exemplary embodiments of the invention, communication processor 132 may generate an interference report, if desired. If the station (e.g., STA A 110) receives any frames with a duration that establishes NAV that crosses the border of the pre-allocated CTA, the station may for example report it to the PBSS Central Point (PCP) as an indication of interference. The station may report it to the PBSS Central Point (PCP) as an indication of interference. For example, the interference report may include the MAC addresses of the interferer. The MAC addresses allow the PCP differentiating the inter-PBSS from the intra-PBSS interference. Furthermore, in the intra-PBSS case, the interference report may be used for the frequency spatial reuse decision making, although the scope of the present invention is not limited in this respect.

Figure 2:
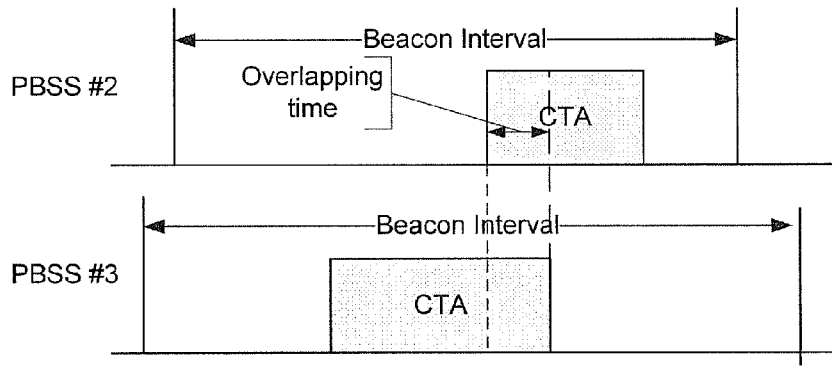
FIG. 2 is a schematic illustration of a timing diagram showing an overlapping communication time of two wireless networks, according to exemplary embodiment of the invention.

Turning to FIG. 2, a schematic illustration of a time diagram 200 showing an overlapping communication time of two wireless networks (e.g., PBSS), according to exemplary embodiment of the invention is shown. According to exemplary embodiment of the invention, a channel time for transmission may be allocated to each pair of stations and/or PBSS (e.g., PBSS#2 STA C and STA D and PBSS#3 STA E STA F). The allocated channel time will be referred herein as a channel time allocation (CTA). According to this example, the CTA of PBSS#2 and PBSS#3 may overlap and may cause interference during the overlapping time. In order to avoid overlapping CTA a protected CTA according to embodiment of the invention may be provided.

Figure 3:
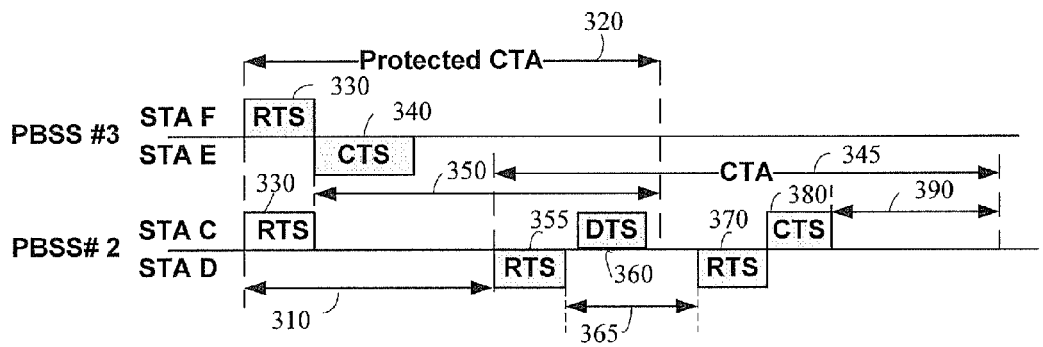
FIG. 3 is a timing diagram of communication time allocation of two communication networks, according to exemplary embodiments of the invention.

Turning to FIG. 3, a timing diagram of communication time allocation of two communication networks, according to exemplary embodiments of the invention is shown. According to this example, timing diagram of PBSS#2 145 which includes the pair stations STA C 130 and STA D 140 and PBSS#3 165 which includes pair stations STA E 150 and STA F 160 is shown. According to this example, STA C 130 and STA D 140 of PBSS#2 145 are in a listening mode and waiting for a channel time allocation (CTA) for transmission during listening time 310. At the same time, STA E 150 and STA F 160 of PBSS#3 165 have already established a direct link and set a protected CTA 320.

According to one example according to embodiments of the invention, during protected CTA 320, STA F 160 may send RTS 330 and STA E 150 may response with CTS 340 (which also may be referred in the WPAN art as mmWaveCTS). STA C 130 may receive RTS 330 and may set a NAV 350 for the remaining duration of protected CTA 320.

At PBSS#2 145, after listening time 310, a CTA 345 may be provided. It should be notice that a portion of CTA 345 is overlapped with a portion of protected CTA 320. During the protected CTA, STA D 140 may send RTS 355 and STA C 130 may send a Denial to Send (DTS) frame e.g., mmWaveDTS 360, if the NAV value is not equal to zero in STA C 130. STA D 140 may wait a predetermined time; for example, delay 365 may try to establish a direct link with STA C 130 by sending RTS 370 and receiving CTS 380. The remaining CTA 390 may be used for communication, although the scope of the present invention is not limited in this respect.

Figure 4:
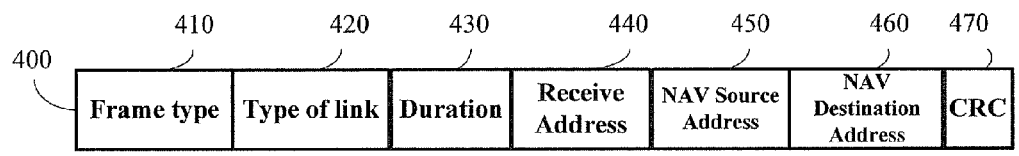
FIG. 4 is a schematic illustration of a mmWaveDTS frame according to embodiments of the invention.

Turning to FIG. 4, a schematic illustration of a frame according to embodiments of the invention is shown. Although the scope of the present invention is not limited to this example, a frame 400 may include the following fields: a frame type field 410, a type of the link field 420, for example, a unidirectional link or bidirectional link, a duration field 430, a receive address field 440, a NAV Source address field 460 and a CRC field 470.

According to this example, duration field 430 may include duration of the CTA time which is intended to be protected. Receive address field 440 may be for example, the address of an intended station, and a Cyclic Redundancy Check (CRC) field 470 may be use to protects integrity of the frame 400, if desired.

According to exemplary embodiments of the invention, a frame type field may include information of the frame type. For example the frame type may be RTS (e.g., mmWaveRTS), CTS (e.g., mmWaveCTS), DTS (e.g., mmWaveDTS) or the like. For example, in the mmWaveDTS frame type, NAV-source address field 450 and NAV destination address field 470 may include an address of a Source STA and an address of Destination STA, respectively. The Source STA and the Destination STA may exchange an RTS frame and the mmWaveCTS frame in order to establish the NAV, if desired. Receive Address field 440 may include a copy of a transmit address field (not shown) of the immediately previous RTS frame to which the mmWaveDTS is a response. According to another example, in the mmWaveDTS frame, Duration field 430 may be set to a NAV duration value (e.g., mmWaveDTS time+SIFS), NAV source address field 450 and NAV destination address field 460 may include the addresses of the stations of the neighboring network, if desired. It should be understood that embodiments of the invention may include other frame structures that may provide the desired functionality for establishing a protected CTA.

Figure 5:
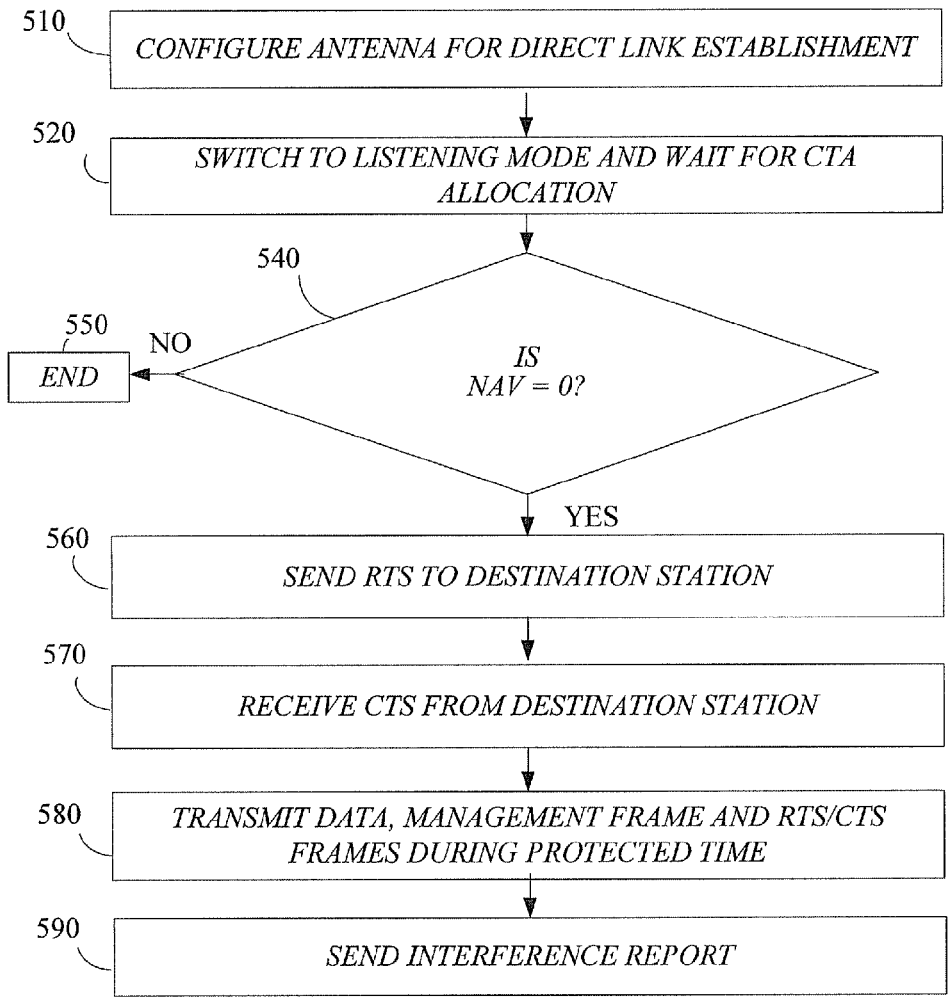
FIG. 5 is a schematic illustration of flowchart of a method of protecting channel time allocation from interference of another wireless network according to some exemplary embodiments of the invention.

Turning to FIG. 5 a schematic illustration of flowchart of a method of protecting channel time allocation from interference of another wireless network, according to some exemplary embodiments of the invention is shown. Although the scope of the present invention is not limited to this respect the method may start by stations of the WPAN (e.g., STA A, STA B, STA C, STA D, STA E, STA F) configuring their antennas for direct link establishment (text block 510). For example, STA A 110 and STA B 120 of PBSS#1 125 may configure their antennas to establish direct link 115, if desired. Pairs of stations (e.g., STA A 110 and STA B 120), stations of each PBSS (e.g., PBSS#1 125), may switch to a listening mode and may wait for a CTA allocation (text box 520). For example the CTA allocation may be done by a piconet controller, a base station and/or by the stations, if desired.

According to one embodiment of the invention the pair of stations may include a Source station and a Destination station. For example, the Source station and the Destination station may be in listening mode not less than a predefined time set by a network protocol (which may be referred in the IEEE 802.11 ad standard as minListeningTime) that precedes a start of the CTA before reserving a protected time for CTA. This time may also be referred as a Reserved Time protection and may allow pair of stations of a PBSS to communicate over a direct link without interference to communications of other pair of stations of other PBSS, although the scope of the present invention is not limited in this respect.

In order to reserve the protected time, the Source station and the Destination station may keep the same antenna configuration for data and acknowledgment transmission and reception. For example, the Source station may transmit a frame (e.g., RTS frame) in the allocated time slot (text box 560). The RTS frame, for example frame of 400, may include at least the address of the Destination station and the duration of time to be protected, if desired. However, the Source station may not issue the RTS frame if the NAV is not equal to zero (diamond 540).

In other embodiments of the invention, the Source station may not issue the RTS if the value of the NAV is greater than zero. However, the Destination station may issue the RTS if the value of the NAV is greater than zero and the last RTS frame it received contained the type field set to unidirectional, and in the mean time the Source station may sense any type of carrier. In addition, the Destination station may not issue the RTS if the value of the NAV is zero and the remaining CTA time is too short to complete the transaction, although it should be understood that the scope of the present invention is not limited to this embodiment of the invention.

If the NAV is not equal to zero the Source station may not send the RTS frame to the Destination station (text block 560). According to one example, the Source STA may send the RTS frame at a start of Reserved Time and/or at the network allocation vector (NAV) expiration within the Reserved Time and/or at any other point inside the Reserved Time not within the NAV time. According to a second example, the Source STA may issue the RTS frame once during a predetermine time e.g., minListeningTime. The Source STA may transmit the RTS frame using the same antenna configuration as for data frame transmission, if desired.

The Destination STA may compare the address in the RTS frame to its MAC address and may respond with a CTS frame if the address is equal to the Destination STA MAC address e.g., NAV destination address 460 (text box 560). According to another exemplary embodiment, the Destination STA may respond with the mmWaveCTS frame to the received RTS frame if the RA is equal to the STA MAC address and the NAV is not equal to zero (text box 570).

According to another example, the Source STA may send the mmWaveDTS frame. The Source STA may send the mmWaveDTS frame as response to an expected but not received CTS frame. Value in the duration field (e.g., Duration field 430) of the mmWaveDTS frame may be calculated using the longest stored NAV duration in the Destination STA (e.g., storage medium 131).

The Destination STA that decides to respond to the RTS frame with mmWaveCTS frame and/or mmWaveDTS frame may send the desired frame at a predefined time determent by a network protocol (e.g., Short Inter frame Space (SIFS) time) after the time that the RTS frame has been received. According to one example, the mmWaveDTS may be transmitted a slot time after a start of the expected CTS frame, if desired.

The Destination STA may transmit the mmWaveCTS and the mmWaveDTS frames using the same antenna configuration as for the ACK frame and/or data frame transmission. The Source STA may receive the CTS from Destination STA (text block 570) and establishes the protected CTA. According to embodiments of the invention the protected CTA may also referred to as a protected time for communication. During the protected the protected time for communication, the pair of stations may transmit and receive data frames, management frames RTS/CTS frames or the like (text box 580) while the establishment of the protected time causes stations of a neighboring network (e.g., PBSS) to halt their transmissions during the protected time. The pair of stations may send an interference report to a piconet controller, if desired (text box 590)

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of reserving time for communication between a source station and a destination station, comprising, at the source station:
    configuring at least one antenna for a direct link establishment;
    switching to a listening mode and waiting for an allocated time period for transmission;
    sending a request to send frame to the destination station based on the allocated time period; and
    receiving a denial to send (DTS) frame transmitted from the destination station.

2. The method of claim 1, comprising:
    keeping a same antenna configuration for data and acknowledgment transmission and receive.

3. The method of claim 1, wherein said DTS frame comprises a receive address field including a copy of a transmit address field of said request to send frame, a network-allocation-vector (NAV) source address field including an address of a first station, and a NAV destination address field including an address of a second station.

4. The method of claim 3, wherein the DTS frame includes a NAV duration value, which is based on a DTS time and a Short Inter-Frame (SIFS) time.

5. The method of claim 1, wherein the DTS frame includes addresses of the stations of the neighboring network.

6. A wireless communication device comprising:
    a beamformer to configure at least one antenna for a direct link establishment;
    a communication processor to listen to a signal of another station, to wait until an allocated time period for transmission and to establish a protected time period within the allocated time period for communication with a destination station, wherein the establishment of the protected time period is to indicate to stations of a neighboring network to avoid transmissions during the protected time period; and
    a transceiver to send a request to send frame to the destination station based on the allocated time period, and to receive a denial to send (DTS) frame from the destination station.

7. The wireless communication device of claim 6, wherein the DTS frame includes a duration field, which is based on a DTS time and a Short Inter-Frame (SIFS) time.

8. The wireless communication device of claim 6, wherein said DTS frame comprises a receive address field including a copy of a transmit address field of said request to send frame, a network-allocation-vector (NAV) source address field including an address of a first station, and a NAV destination address field including an address of a second station.

9. The wireless communication device of claim 6, wherein the DTS frame includes an address of the stations of the neighboring network.

10. The wireless communication device of claim 6, wherein the communication processor comprises a network allocation vector (NAV) timer, and said communication processor is to assert to said NAV timer a value, which is received in a duration field of a received frame.

11. The wireless communication device of claim 10, wherein the NAV timer is to run at a speed of a global clock.

12. The wireless communication device of claim 10, wherein the NAV timer is to count down and to be locked at a zero value.

13. The wireless communication device of claim 10, wherein the communication processor is to reset the NAV timer by receiving a frame containing a medium access control (MAC) address that is equal to the MAC address in the frame that asserts the NAV timer value.

14. The wireless communication device of claim 10, wherein the communication processor is to compare the value of the duration field with the value of the NAV timer value and change the NAV timer value when the value of the duration field of the received frame is longer than the NAV timer remaining value.

15. A wireless communication system comprising:
    a source station comprising
        at least one antenna;
        a beamformer to configure said at least one antenna for a direct link establishment;
        a communication processor to listen to a signal of another station, to wait for an allocated time period for transmission, and to establish a protected time period within the allocated time period for communication with a destination station, wherein the establishment of the protected time period is to indicate to stations of a neighboring network to avoid transmissions during the protected time period; and a transceiver to send a request to send frame to the destination station based on the allocated time period, and to receive a denial to send (DTS) frame from the destination station.

16. The wireless communication system of claim 15, wherein the DTS frame includes a duration field.

17. The wireless communication system of claim 15, wherein the DTS frame comprises a receive address field including a copy of a transmit address field of said request to send frame, a network-allocation-vector (NAV) source address field including an address of a first station, and a NAV destination address field including an address of a second station.

18. The wireless communication system of claim 17, wherein the DTS frame includes an address of the stations of the neighboring network.

* * * * *